(12) United States Patent
Ganesan

(10) Patent No.: US 11,256,769 B2
(45) Date of Patent: Feb. 22, 2022

(54) METHODS, DEVICES AND SYSTEMS FOR IMPROVED SEARCH OF PERSONAL AND ENTERPRISE DIGITAL ASSETS

(71) Applicant: Anand Ganesan, Los Altos, CA (US)

(72) Inventor: Anand Ganesan, Los Altos, CA (US)

( * ) Notice: Subject to any disclaimer, the term of this patent is extended or adjusted under 35 U.S.C. 154(b) by 111 days.

(21) Appl. No.: 15/990,665

(22) Filed: May 27, 2018

(65) Prior Publication Data

US 2019/0361946 A1 Nov. 28, 2019

(51) Int. Cl.
| | |
|---|---|
| *G06F 16/00* | (2019.01) |
| *G06F 16/9535* | (2019.01) |
| *G06F 16/2457* | (2019.01) |
| *G06F 16/9538* | (2019.01) |

(52) U.S. Cl.
CPC .... *G06F 16/9535* (2019.01); *G06F 16/24578* (2019.01); *G06F 16/9538* (2019.01)

(58) Field of Classification Search
CPC .................................................. G06F 16/9535
See application file for complete search history.

(56) References Cited

U.S. PATENT DOCUMENTS

| | | | | |
|---|---|---|---|---|
| 7,415,439 B2* | 8/2008 | Kontio | ................... | H04L 9/0894 705/53 |
| 9,811,576 B2* | 11/2017 | McGregor | ............ | G06F 16/285 |
| 10,430,805 B2* | 10/2019 | Soderberg | ............. | G06F 16/435 |
| 2004/0249768 A1* | 12/2004 | Kontio | ................... | H04W 12/03 705/65 |
| 2005/0004875 A1* | 1/2005 | Kontio | ................... | H04L 9/0894 705/52 |

(Continued)

OTHER PUBLICATIONS

International Search Report and Written Opinion of the International Searching Authority dated Aug. 16, 2019 in PCT/US19/33713.

(Continued)

*Primary Examiner* — Farhan M Syed
(74) *Attorney, Agent, or Firm* — Young Law Firm, P.C.

(57) ABSTRACT

A computer-implemented method may comprise iteratively receiving a tag selected by a user of the computing device; storing the received tag in a memory of a computing device; associating, by a processor of the computing device, the stored tag with at least one digital asset stored in the computing device or stored in a remote storage of the user that is accessible over a computer network; and generating, by the processor, a graphical representation of the received tag. A search request may then be received, via the user interface, the search request comprising an expression including at least one of the tags stored in the memory of the computing device. The processor may then identify at least one of the user's digital assets that is associated with at least one of the tags in the search request. A visual representation may then be generated of each tag included in the expression of the search request, the visual representation being representative of the expression of the search request and indicating a number of digital assets associated with each tag included in the expression of the search request. A file list may then be generated that comprises each digital asset that is associated with each tag included in the expression of the search request.

25 Claims, 5 Drawing Sheets

TAG BAR

APPLIANCE, REFRIGERATOR, FLOORING    102

(56) References Cited

U.S. PATENT DOCUMENTS

| | | | | |
|---|---|---|---|---|
| 2007/0112676 | A1* | 5/2007 | Kontio | H04L 63/12 |
| | | | | 705/50 |
| 2008/0263103 | A1* | 10/2008 | McGregor | G06F 16/447 |
| 2009/0046898 | A1* | 2/2009 | Li | G06Q 10/10 |
| | | | | 382/113 |
| 2011/0113385 | A1* | 5/2011 | Sayers | G06F 16/954 |
| | | | | 715/853 |
| 2011/0196859 | A1* | 8/2011 | Mei | G06F 16/248 |
| | | | | 707/723 |
| 2012/0030244 | A1* | 2/2012 | John | G06F 16/958 |
| | | | | 707/797 |
| 2012/0236201 | A1* | 9/2012 | Larsen | H04N 21/439 |
| | | | | 348/468 |
| 2013/0298050 | A1* | 11/2013 | Emanuel | G06F 3/04842 |
| | | | | 715/764 |
| 2016/0026702 | A1* | 1/2016 | McGregor | G06F 16/435 |
| | | | | 707/624 |
| 2016/0170994 | A1* | 6/2016 | Soderberg | G06Q 30/02 |
| | | | | 707/748 |
| 2018/0121530 | A1* | 5/2018 | McGregor | G06F 16/27 |

OTHER PUBLICATIONS

Tabbles, webpage, downloaded from https://alternativeto.net/software/tabbles/ on Jul. 26, 2018.

Tabbles Wikipedia page, downloaded from https://en.wikipedia.org/wiki/Tabbles on Jul. 26, 2018.

* cited by examiner

TAG BAR

APPLIANCE, REFRIGERATOR, FLOORING ~ 102

SEARCH BAR

MyFrequentSearch ~ 202

| Tag | Remarks |
|---|---|
| Creation Date | Creation Date of the asset |
| Update Date | Latest Update Date of the asset |
| Christmas | If the creation date or update date of the asset is 12/25 |
| New Year | If the creation date or update date of the asset is 01/01 |
| New Year's Eve | If the creation date or update date of the asset is 12/31 |
| Halloween | If the creation date or update date of the asset is 10/31 |
| Thanksgiving | If the creation date or update date of the asset is 4th Thursday of November |
| Birthday | If the creation date or update date of the asset is Birthdate of the owner |
| Weekend | If the creation date or update date of the asset is Saturday or Sunday |
| Word | Any MS Word document |
| Excel | Any MS Excel file |
| Email | Any email |
| Image | Png, jpeg, bmp, tiff etc |
| Video | All video files AVI, FLV, WMV, MOV, MP4 |
| Audio | All audio files MP3, WAV, WMA, AIFF, etc. |
| {extension} | The actual extensions of the file |
| Text | Txt file |
| January | If the month of creation date or update date of the asset is January |
| February | If the month of creation date or update date of the asset is February |
| March | If the month of creation date or update date of the asset is March |
| April | If the month of creation date or update date of the asset is April |
| May | If the month of creation date or update date of the asset is May |
| June | If the month of creation date or update date of the asset is June |
| July | If the month of creation date or update date of the asset is July |
| August | If the month of creation date or update date of the asset is August |
| September | If the month of creation date or update date of the asset is September |
| October | If the month of creation date or update date of the asset is October |
| November | If the month of creation date or update date of the asset is November |
| December | If the month of creation date or update date of the asset is December |
| Attachment | Came as an attachment in an email |
| {sender's smtp email address} | Actual SMTP email address of the email sender. |

FIG. 4

METHODS, DEVICES AND SYSTEMS FOR IMPROVED SEARCH OF PERSONAL AND ENTERPRISE DIGITAL ASSETS

BACKGROUND

Some Internet search engines return and rank links to content based upon keywords. Such search engines rank pages by how often the search terms occurred in the page, or how strongly associated the search terms were within each resulting page. Other Internet search engines rank web pages that match a given search string based upon human-generated links, with the underlying assumption that web pages which are linked to from other important pages are themselves likely to be important or at least relevant to the user's search request. Google's PageRank algorithm is an example of such search engines algorithms. PageRank computes a recursive score for web pages, based on the weighted sum of the ranking of the pages linking to them. However, all such search engines return results based on what the supplier of the ranking information deems to be important, which results may or may not be important or relevant to the user. For example, PageRanking or keyword searches both assume that what the search engine deems relevant to the majority of users will be relevant or useful to the user having entered the search. Often, that assumption is valid, sometimes it is not. Moreover, Google's and other's search engines typically return other people's web pages and documents, and do not consider the user's own files, photos, documents.

BRIEF DESCRIPTION OF THE DRAWINGS

FIG. 4 is a table showing examples of programmatically-generated user tags, according to one embodiment.

FIG. 7 also shows exemplary tangible, non-transitory computer-readable media having data stored thereon representing sequences of instructions which, when executed by the computing device, cause the computing device to carry out and provide the functionality shown and described herein.

DETAILED DESCRIPTION

Figures 1, 2, 3:
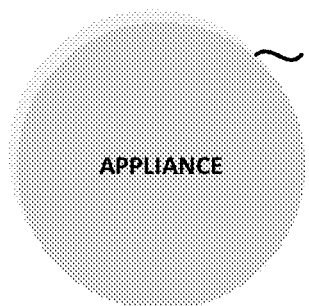
FIG. 1 shows a tag bar according to one embodiment.
FIG. 2 shows a search bar according to one embodiment.
FIG. 3 shows an exemplary user interface to illustrate aspects of an embodiment.

The term "search", connotes an operation to find, identify and retrieve content, files or any type of data. Most often, all or almost all of the information retrieved from an Internet search is a priori unknown to the user having initiated the search. The returned results are based upon keywords (often manually or programmatically inserted into a file or a website's metadata), which flags information that is deemed important by others, and which may or may not be important or even relevant to the user having initiated the search. The scope of such a search is generally outside of the user's own data. Most often, the search encompasses the entire Internet, but leaves out the user's own data and content. The search that is carried out is, in fact, a search for other people's information. Indeed, Internet search engines leverage open access to other people's information and unstructured searches to return what is, functionally speaking, an enormous ranked listing of publicly-available information that was previously generated and made available by others for public consumption.

Embodiments, as described herein, are not drawn to the concept of "search", as the term's usage was developed above. Instead of searching for information, embodiments are focused on retrieving the consumer's own digital assets, which digital assets may be local to the user or to a group of individuals. The distinction between search for information and retrieval of digital assets is significant. According to one embodiment, the terms "assets" or "digital assets" encompass any soft item that can reside on the individual's device or is stored remotely to the individual's device. A user's assets can reside on the user's own devices (Mac or Windows, iOS or Android devices and the like) and/or may reside on storage (e.g., a cloud) that is remote to the user's devices and that is accessible to the user's or a group including the user. Example of assets include, without limitation, the user's own photos, movies, PDFs, Excel files, Google docs, emails, documents, folders, media, documents and the user's information and files uploaded to social media platforms and the like. Generally speaking, the consumer's own data, files, content, file structures and the like comprise the user's assets. In one embodiment, a search of the user's own information is carried out based upon a search (retrieval) request, and the user's own information that satisfies the structured query is retrieved from where the user stored it, and presented back to the user.

To enable such retrieval, rather than relying on search provider tags or key words, embodiments utilize user tags that may be made up and associated with selected digital assets by the user, ensuring that the user tags are perceived by the user to be important or useful. Since the user tags are made up and used solely by the user, they are personal to the user. Since they are personal to the user, they need not be relevant to anyone else. Indeed, the user may, according to one embodiment, apply a user tag of "wrinkled" to a JPG image of an elephant the user saw last year in a zoo and the same user tag "wrinkled" to Word document about construction materials. When used in a keyword search in popular search engines, the search may return definitions of the word, synonyms and a few pictures of elephants, shar-pei puppies and elderly people. According to one embodiment, however, when the user tag "wrinkled" is utilized as a user tag, what is retrieved may include only the user's own digital assets and, more particularly, a subset of the user's own assets that have been tagged by the user with the user tag "wrinkled"; namely, in this case, the JPG of the elephant and the construction materials document. The scope of the search, according to one embodiment, therefore, is delimited by the user's own digital word. As such, retrieval is inherently more personal than search.

A tag, according to one embodiment, is a set or a category to which the user associates his or her assets. An asset can be tagged to more than one category. Tags may be readily and intuitively understandable by others or may be intimately personal to the user. For example, an image of an elephant may understandably be associated, by the user, with the user tag "wrinkled", as elephants typically have wrinkled skin. However, the same user may also associate the user tag "doula" with the same elephant picture, as the elephant's eyes may remind the user of the wrinkled eyes of an obstetrics nurse she once knew. In this manner, although the user tag "doula" may not evoke an image of an elephant to anyone else, to the user, such association may be indelibly seared in her memory. While the association may make no sense to others, for that particular user, such association may constitute the most logical and intuitive way of marking or evoking a piece of digital information for later retrieval.

One embodiment, therefore, is a tool to retrieve a user's own assets and/or assets that are local to the user or to a group of users. The tool, according to embodiments, may function both as a consumer application as well as an enterprise application. Indeed, consumers may use the present retrieval tool in their personal devices (laptop, smartphones, tablets). A group of users may utilize the present retrieval tool in private clouds. For example, the present retrieval tool may be used by individuals who have been granted proper authorization to access remote storage services such as Dropbox or Box. Enterprise users can use the embodiments described and shown herein to efficiently retrieve confidential corporate assets stored on an intranet, for example. Moreover, the present retrieval tool may be used by groups within the enterprise in conjunction with their private cloud to retrieve remotely-stored confidential corporate assets. In that case, the tags used by enterprise users may include code names, lingo or internal part numbers, for example, that are particular to a project or to the enterprise as a whole.

According to one embodiment, retrieval of assets as described and shown herein de-emphasizes the file structure, including file names, folders, hierarchies, paths, locations and directories in favor of more personal and intuitive tags. The underlying file system of the user's device is not altered, but the present retrieval tool abstracts away from such an organizational structure. Moreover, the present retrieval tool removes the need to launch individual applications to access the corresponding assets (photos, videos, emails etc.) in laptops and mobile devices, as the user may simply double click (or perform some functionally-similar action) on a retrieved digital asset to view and/or interact with it in its native application. The association of user tags with the user's own digital assets enables the categorization thereof under one or more intuitive and personal categories without the need to associate these digital assets with their file type, storage location, etc. The present retrieval tool, therefore, enables a highly personal search, highly relevant retrieval of digital assets and provides a pleasant user experience in tagging, searching and retrieval.

Tagging Assets

According to one embodiment, the present retrieval tool includes a tagger module that is configured to enable the user to associate tags with his or her digital assets. Once associated with assets, tags can be used to retrieve the assets associated with the tags. Super tags, according to one embodiment, may be associated with a group of predetermined tags or a structured expression that includes tags and operators, thereby enabling the user to use a convenient super tag instead of re-entering the corresponding group of predetermined tags or structured expression. For example, a user may have entered the following tags in a retrieve software module: "Los Altos, Stucco and 'My fav mid-century houses'", to retrieve all of his own personal digital assets associated with Los Altos, stucco and his or her favorite examples of mid-century architecture. The user may then associate a super tag called "attractive local houses" to the entered expression "Los Altos, stucco and 'My fav mid-century houses'", enabling the user to simply enter "attractive local houses" to retrieve the same digital assets, rather than repeating (and having to remember) the original expression "Los Altos, stucco and 'My fav mid-century houses'".

A user interface may be configured to enable the user to manually enter tag names, to associate specific tags with specifically-identified digital assets or classes or groups of assets. For instance, one embodiment provides for a tag bar, such as shown at 102 in FIG. 1. The tag bar 102, according to one embodiment, is an area of the display of the user's computing device where the user can manually type the tag names (or enter tag names using some other data entry modality, such as voice). In FIG. 1, the tag names entered by the user include Appliance, Refrigerator, Flooring. Similarly, a search bar may be provided, such as shown at 202 in FIG. 2. The search bar 202, according to one embodiment is where the user can manually enter the pre-existing tags to retrieve the digital assets previously associated with the entered tags. In FIG. 2, the user has entered MyFrequentSearch, which may be either a tag name or a super tag. In one embodiment, the functionality of the tag bar 102 and the functionality of the search bar 202 may be provided in a single user interface tag/search bar, with context and/or the user causing the bar to toggle between tagging and searching functionalities. In one embodiment, the tag bar 102 may be configured to Autocomplete tag names. That is, when the user begins entering a tag name in the tag bar, the tag bar 102 should automatically list the available tags that match the typed characters. In one embodiment, tag names may be separated by commas (for example) so the Autocomplete is only active for the tag name currently being typed. The search bar 202, according to one embodiment may also include Autocomplete functionality, such that when the user starts entering tag names, the Autocomplete may suggest tag names that match the characters typed thus far.

Tagging assets may be carried out, according to one embodiment, by a tagger module. One embodiment of a user interface configured to enable the user to interact with the Tagger module is shown in FIG. 3. In one embodiment, the user interface may comprise three user interaction areas; namely, an asset area 302, an existing tag area 304, and a manual tag entry area 306. As shown in FIG. 3, assets that are available for tagging are listed on one side of the tagger screen, in the asset area 302. The available tags (Appliance, Refrigerator, Flooring) are shown within the existing tag area 304. In one embodiment, the available tags may be simply listed within the existing tag Area 304. In another embodiment, tags may be represented by tag balls, as shown at 308, 310 and 312. A tag ball On/Off button may be provided, and configured as a toggle switch. If the tag ball On/Off switch is ON, tag balls (such as shown at FIG. 3, for example) will be used to tag assets. Moreover, If the tag ball On/Off switch is ON, tag balls will also be used to retrieve previously-tagged assets. If the tag ball On/Off switch is OFF, tag balls will not be used to tag assets and will not be used to retrieve assets. In that case, a text-based user interface may be used to tag and retrieve the user's digital assets. The tag bar may also be configured, according to one embodiment such that when the user completes entering tag name, a tag ball may smoothly fall and bounce into the tag ball area in a pleasing manner, if tag balls are enabled. Other effects may be implemented to provide a pleasant user experience.

Returning now to FIG. 3, tag balls are user interface components that represent tags, with each tag ball representing one tag. In the case of FIG. 3, three tag balls 308, 310, 312 are shown, representing the Appliance, Refrigerator and Flooring tags, respectively. Although not shown in FIG. 3, some or all of the tag balls may have different colors and/or other attributes, to better differentiate them from one another and to enhance the user experience.

In use according to one embodiment, the user is allowed to select and de-select assets from the list of available assets in the asset area 302. In FIG. 3, the user has selected three PNG files; namely Img_2006.png, Img_2007.png and Img_2008.png from the list. According to one embodiment, the available assets may be of heterogeneous file types or may all be of the same or a limited number of file types. For example, if the tagger module was initiated (using a launcher module, for example, as discussed below) from within an application (such as MS Word, Adobe Photoshop), the assets shown in the asset area 302 may all be of a file type that is compatible with the application. For example, if the tagger module was initiated within MS Word, then the asset area may only list assets that are compatible with MS Word. Likewise, if the tagger module was initiated from Adobe Photoshop, the asset area 302 may only list assets having an image or a graphical format that are compatible with Photoshop, such as the .PNG files shown in FIG. 3. For example, if the user is in MS Word and wishes to tag the current Word document, the user may be given the opportunity to click on a tag button from the Word application, and the tagger module will be launched with only the current MS Word document listed in the asset area 302.

As suggested at 314, the user may choose the tags that are to be associated with the assets selected in the asset area 302. Although a cursor is shown at 314, other input modalities may be supported, such as touch. As shown in FIG. 3, the user has selected Img_2006.png, Img_2007.png and Img_2008.png and has associated the tag "Flooring" therewith, by selected the tag ball 312, labeled "Flooring".

A manual tag entry area 306 may be provided, enabling the user to manually enter the tag names instead of selecting from the displayed tags in the existing tag area 304. In one embodiment, as the user enters (e.g., types in) the tag names in the manual tag entry area 306, an autocomplete feature may be activated and suggest tag names that match the characters entered thus far by the user. This reduces the instances of misspellings, in which several tags (Appliance, Applience, Apliance) are mistakenly created when only one is intended. After selecting/deselecting assets and after selecting the tags that are to be associated with the elected assets (or entering the tag names separated by commas), the asset/tag association may be automatically activated or the user may be required to click on a "TAG" button 316 or other similar graphical user interface component.

A user's own digital assets may be manually tagged by the user. The user may select existing tags and/or may create new tags having intuitive, suggestive names or highly personal, non-intuitive tag names. Assets need not be tagged manually, however. In fact, according to one embodiment, as assets are created and saved in the user's devices, some or all of the digital assets may be programmatically tagged using predetermined categories and tag names. FIG. 4 is an exemplary table of tags that may be associated with digital assets, according to one embodiment. It is to be understood that the list of tags shown in FIG. 4 is non-exhaustive and that the many more or fewer tags may be provided. Some of these tags may be pre-seeded, while others may be devised by the user. FIG. 4 shows a tag list for the consumer market. The Enterprise version of such a list may be quite different, and is more likely to be customized for and by the deploying company or organization. Indeed, the tag list for the Enterprise may be created based on the type of Enterprise, the business model of the Enterprise and the type of assets to be tagged.

For example and with continued reference to FIG. 4, some of the tags that may be automatically associated with a given asset include "Creation Date", which is a tag that includes the date at which the asset in question was created. Similarly, the month of creation of the asset may also be tagged, using the names of the months as tags. The program that created the asset may also be tagged, including, for example, MS Word, Excel, etc. Similarly, the file type may be automatically tagged. As should be apparent, assets may be programmatically associated with many different tags and may be sorted and searched using any one of the tags or any combination of tags. Moreover, an asset may be associated with programmatically-associated tags as well as manually-associated tags. For example, a JPG file may be associated with tags indicating the creation date, the application that created the file, the month of creation or update of the file, and manually-associated tags such as "Jim's Birthday" and "Dog". The manually-associated tags need not be descriptive or even evocative of the content of the asset, suffice it for the manually-associated tags to be meaningful or otherwise useful to the person who created them.

In one embodiment, the application embodying an embodiment utilizes its own algorithms to programmatically associate tags with assets. In another embodiment, remote servers and remote cloud-based services may be used to programmatically associate tags with assets. For instance, cloud-based services such as Amazon Web Services (AWS), Microsoft's Azure, together with artificial intelligence or machine learning may be leveraged to analyze the user's digital assets, derive useful information therefrom and tag or suggest tags to be associated with assets.

Retrieving Assets

Retrieving assets, according to one embodiment, includes actions in which the user inputs tags as search criteria and is presented with his or her digital assets (if any) that are associated with one or more of the (depending upon the search) inputted tags. When the user enters tags to retrieve assets, such search can be given a name (e.g., a super tag), which allows the user to retrieve the same list of assets by simply entering the search name (the super-tag), without manually re-entering all the desired tags. According to one embodiment, the retrieval of assets by matching tags and assets may be carried out by a retriever module.

Figure 5:
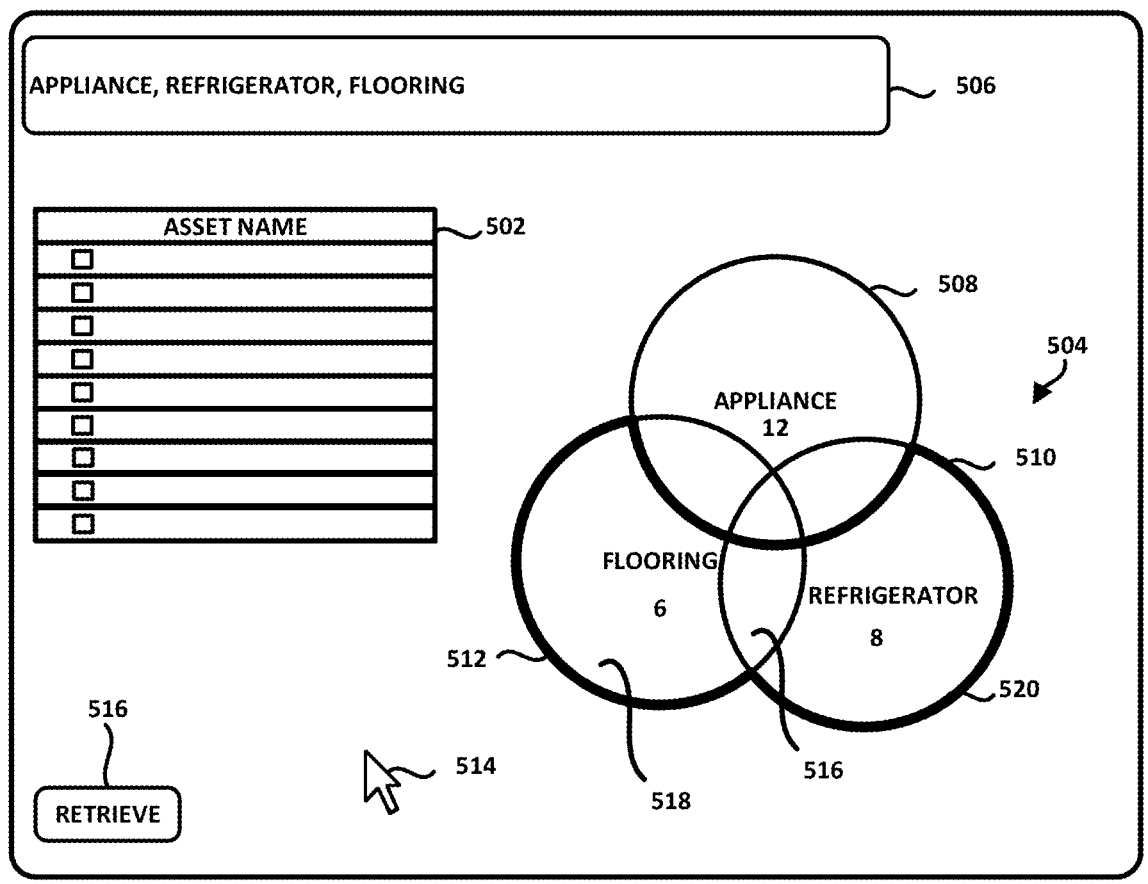
FIG. 5 illustrates further aspects of a computer-implemented method according to one embodiment.

FIG. 5 shows an example of a user interface configured to enable a user to interact with the retriever module, according to one embodiment. As shown therein, the retriever module allows the user to retrieve assets by providing tag names. Indeed, in the example shown in FIG. 5, the user has inputted the tags Appliance, Refrigerator and Flooring in the tag bar 506. Note that while the user can input any combination of manual tags, programmatically-associated tags or deep tags (tags created or suggested by a remote server or service), the present retriever module may also be configured to enable the user to turn off one or more of these tag types. For example, the user may search based entirely upon programmatically-associated tags, based entirely on manually-created and associated tags or any combination of manual, programmatically-associated or deep tags. In one embodiment, the user may input a string of tags in the tag bar 506, without specifying any logical operation thereon. As shown in FIG. 5, the user has simply inputted Appliance, Refrigerator and Flooring in the tag bar 506, without specifying any logical operation thereon. In that case, the tag ball area 504 may simply show tag balls 508, 510 and 512, one tag ball for each tag entered into the tag bar 506. Note that one or more of the assets may be tagged with more than one of the Appliance, Refrigerator and Flooring tags. For instance, one of the assets tagged with the Refrigerator tag may be a PDF of a remodel estimate, while another JPG asset may show a Refrigerator and tigerwood flooring and may, therefore, be associated with both the Refrigerator and Flooring tags. One or more of these assets may also be tagged with the Appliance tag. As shown, the tag balls are arranged in the tag ball area in a manner that suggests that at least some of the user's digital assets are associated with more than one tag, as the tag balls 508, 510 and 512 partially overlie each other. Had one or more of the user's digital assets been associated with the entered Appliance tag, but not the Refrigerator or Flooring tags, the appliance tag ball 508 would be positioned in the tag ball area separately from the Refrigerator tag ball 510 and separately from the Flooring tag ball 512. Similarly, had one or more of the user's digital assets been associated with the entered Refrigerator tag, but not the appliance or Flooring tags, the Refrigerator tag ball 510 would be positioned in the tag ball area separately from the Appliance tag ball 508 and separately from the flooring tab ball 512. Likewise, had one or more of the user's digital assets been associated with the entered Flooring tag, but not the Appliance or Refrigerator tags, the Flooring tag ball 512 would be positioned in the tag ball area 504 separately from the Appliance tag ball 508 and separately from the Refrigerator tag ball 510.

In this manner, according to one embodiment, the appearance of the tag balls in the tag ball area gives the user some information about his or her own digital assets associated with the entered tags. More particularly, according to tone embodiment, the positioning of the tag balls with respect to one another may provide simple and intuitive information about the user's digital assets associated with one or more of the entered tags. For example, each of the tag balls 508, 510, 512 in the example shown in FIG. 5 overlaps another one of the tag balls, indicating that each of the assets associated with each of the entered tags is also associated with each of the other entered tags. Indeed, each of the tag balls 508, 510, 512 intersects or overlaps with each of the other tag balls. Using the cursor 514 or any other pointing device or user interface modality, the user may select any of the tag balls or areas where one or more tag balls intersect, and the retriever module may dynamically populate the asset area 502 with the user's digital assets associated with the tag or tags. For example, if the user selects area 516, the retriever module may retrieve all or some of the user's digital assets that have been tagged with the Flooring and Refrigerator assets, not including those assets that are tagged or also tagged with the Appliance tag. In another example, the user may wish to see, in the asset area, those assets that have been tagged with the Flooring tag and may do so by selecting the area referenced by 518 in FIG. 5. Such a request may also retrieve assets that are also tagged with the Appliance and Refrigerator tags. Should the user wish the asset area 502 to be populated only with the assets that are associated with the flooring tag, but not the appliance or refrigerator tags, another action may be taken such as, for example, double clicking the area 518 to indicate that only those assets associated with the flooring tag, but not the appliance or refrigerator tags are to be retrieved. The user interface may be configured to enable or require other actions within the tag ball area to select or restrict retrieval of assets.

As shown in FIG. 5, the tag bar 506 is configured to receive one or more tags. According to one embodiment, rather than interact with the tag balls in the tag ball area 504 to retrieve particular digital assets, the tag bar 506 may also be configured to accept, interpret and retrieve assets based upon compound queries comprising tags and logical (e.g., Boolean) operators such as AND, OR and NOT or based upon Set Operators such as Union, Intersection, Difference, complement and Disjoint. For example, the user may enter the following compound search request in the tag bar 506: Flooring AND Refrigerator NOT Appliance. Accordingly, the retriever module would respond to such query by populating the asset area 502 with all of the user's digital assets that are associated with the Flooring and Refrigerator tags, but not the Appliance tag. In the tag ball area 504, such a search request would correspond to the area referenced by the bold outline at 520.

In one embodiment, an asset in the asset area 502 may be "launched" by selecting the assets (e.g., by double clicking upon the listed asset). For instance, if one of the assets listed in the asset area (and which, therefore, is associated with the listed asset or combination of assets) is an Excel spreadsheet, selecting that asset may launch MS Excel or some other compatible viewer, to enable the user to examine and/or modify or delete the asset using its native application.

Tag Balls and Tag Ball Operation

In one embodiment, tag balls, such as shown at FIGS. 3 and 5 may be utilized to provide the user with an intuitive and graphical representation of tagged assets. However, embodiments need not use the tag ball construct and, instead, may rely upon text-based indicia and/or other graphical representations. As noted above, tag balls may be rendered in different colors. The colors of the tag balls may be significant or randomly-assigned, as tag balls are rendered for the user. Generally, however, it is recommended that tag balls be rendered in light, pleasant tones, with a slightly darker border so that when Tag balls overlap one another, their respective borders are visible.

In one embodiment and as shown in FIGS. 3 and 5, the tag names should be displayed within, for example, the tag balls. For instance, in FIG. 5, the tag "Appliance" is displayed within tag ball 508, the tag "Refrigerator" displayed within tag ball 520 and the tag "Flooring" is displayed within tag ball 512. As also shown in FIG. 5, tag balls may be configured to also list the number of assets associated having the tag in question associated therewith. As shown therein, the Appliance tag balls has 12 assets associated with the Appliance tag, the Flooring tag ball has 6 assets associated with the Flooring tag and the Refrigerator tag ball has 8 assets associated with the Refrigerator tag.

According to one embodiment, at least the tagger module and the retrieve module may be configured to enable the user to customize the appearance of the tag balls according to their liking. For example, the user may be provided with the ability to:

drag the tag balls anywhere within the tag area;
    drag and overlap two or more tag balls;
    enlarge or reduce the size of the tag balls;
    select and deselect a tag ball for tagging;
    group two or more tag balls into a group. In one embodiment, such a group itself may morph into a ball shape and would include some visual indicium to indicate that the resulting tag ball is not an original tag ball but instead is a group ball (a ball of balls, as it were); and
    do anything with a group ball that the user can do with a tag ball According to one embodiment, the appearance of a tag ball may be changed when selected by the user. Such changes may include highlighting a border area, color, hue or color intensity of the tag ball. For instance, according to one embodiment, when the user clicks or touches any bordered area of one or more tag ball(s), that area should become light or glow, if it was bright before (i.e. selected) or that area should become bright if it was light or glowing before (i.e. deselected). Other effects are possible within the context of the present disclosure.

In one embodiment, when the tag balls are colored and overlap, the intersection between the two may change color to emphasize the intersection. For example, the colors of tag balls can mix in an additive or subtractive manner to show that some assets have two or more tags associated therewith. Instead of color, various hashes and cross-hatches can be used to show tag ball intersections. Other ways of graphically representing the union and intersection of tag balls may be readily devised, as those of skill in this art may recognize.

Asset Areas

The asset area, as shown at reference numeral 302 in FIG. 3 and 502 in FIG. 5, lists the digital assets that are selected for tagging as shown in FIG. 3 or that constitute the results of an asset retrieval operation as shown in FIG. 5.

In FIGS. 3 and 5, the asset area shows only the file name of the asset in question. However, the asset area may be configured to show as many attributes of the assets in question as are associated with the asset, space permitting. The asset area may display different attributes for different classes or type of digital assets. For example, many assets may be associated with attributes including asset name, creation date and time, created by, and the like. Email assets, however, may have different or additional attributes that are unique to emails and the asset area may be configured to show such attributes as desired. As shown in FIGS. 3 and 5, each asset may have a select/deselect button (or some other user interface component) to select and deselect the asset. As shown in FIG. 3, the Asset Area 302 may comprise a select all/deselect all button (as shown, next to the ASSET NAME column header in FIG. 3). In one implementation, the assets listed in the asset area may be scrollable, may be listed top to bottom or left to right depending the space and size available for the asset area, and may be listed with the following default attributes: asset name, asset type image and asset thumb nail (if the digital asset is or includes image or video).

Modifying Assets

The user may modify an asset or its properties. According to one embodiment, some or all of the tags associated with the unmodified asset also may be associated with the modified asset. However, when the user modifies an asset, one or more of the associated tags may no longer fit the modified asset and/or one or more other assets that did not fit the asset before it was modified may now fit the modified asset. Accordingly, a maintainer module may be provided to programmatically handle the tagging of the modified asset. According to one embodiment, the maintainer module may also be configured to enable the user to maintain (e.g., add, delete tags, change tag names) tags. In one embodiment, the existing tag area in conjunction with the manual tag entry area may be used to maintain tags. According to one embodiment, the maintainer module may be configured to enable the user to add new tags, change tag names and delete tags. According to one embodiment, when a tag is deleted, the maintainer module may inform and show the affected digital assets. In other words, the maintainer module may be configured to show a list of the assets (if any) that will lose their association with the deleted tag (presuming that one or more assets had previously been associated with the tag to be deleted). When the user confirms the deletion of a tag, the Maintainer module untags (i.e., breaks the association) of that tag with the digital asset(s) associated with the deleted tag.

As noted above, the maintainer module may be configured such that when a user renames an asset, the tag associations are preserved. For instance, according to one embodiment, if an asset called myphoto.png is renamed to ourPhoto.png, then the tags associated with myPhoto.png asset would become associated with the renamed asset ourPhoto.png. Assets can be deleted, which does not delete any tags associated therewith, but breaks the association between the tag and the now-deleted asset.

Launch and Launcher

According to one embodiment, a launcher module may be provided to enable an appropriate application to open an asset that the user wants to open by, for example, double clicking on the asset or performing some other functionally-similar action. According to one embodiment, any asset is that is selected from the retriever module user interface may be opened by the appropriate launcher application, via the launcher module. For example, if an image is listed by the retriever module, the user can tap or double click on the image and to launch its default launcher application such as, in this case, a photo viewer or editor. Other examples of launchers include MS Word to launch Word documents or a text editor (e.g., Notepad in Windows) may be the launcher for a text document.

According to one embodiment, one or more of the launcher applications may be provided with a button or other user interface configured to initiate the tagger module. Such a button may simply be called a "Tag" button. According to one embodiment, when the user is viewing or modifying an asset in any of the launcher-supported applications (i.e., launcher applications provided with the Tag button and the ability to launch the tagger module), the asset may be eligible for tagging via the tagger module such that one or more tags become associated therewith. For example, when a user opens a document in MS Word, that document may be selected for tagging by default. If the user wishes to tag that word document, the user may then select the tag button, which initiates the tagger module. That document may also, according to one embodiment, become programmatically tagged with one or more tags as shown in FIG. 3, without further involvement from the user.

Some launcher applications may launch multiple assets at the same time. For example, the email client MS Outlook or any email software usually lists multiple emails, each one of which may be considered to be and treated as, one of the user's digital an asset. If one or more emails are to be tagged, the user may highlight and select them. After selection, the user may, for example, right-click the selected emails and select "Tag" from the context menu, which action would cause the initiating of the tagger module.

Finder-Explorer

Finder-Explorer is the folder/file exploring tools that are part of Windows and MAC systems. In Windows-based systems, the tool is called Windows Explorer and in MAC-based systems, the tool is called the Finder. For simplicity's sake, herein below, these tools will be called Finder-Explorer. According to one embodiment, when the user is listing his or her assets through Finder-Explorer, the user is given the opportunity to select (e.g., right-click) the asset to select that asset and click on a "Tag" button in the Context Menu. When "Tag" is selected on the Context Menu, the tagger module may be launched, to enable the user to tag the selected asset or assets.

Figure 6:
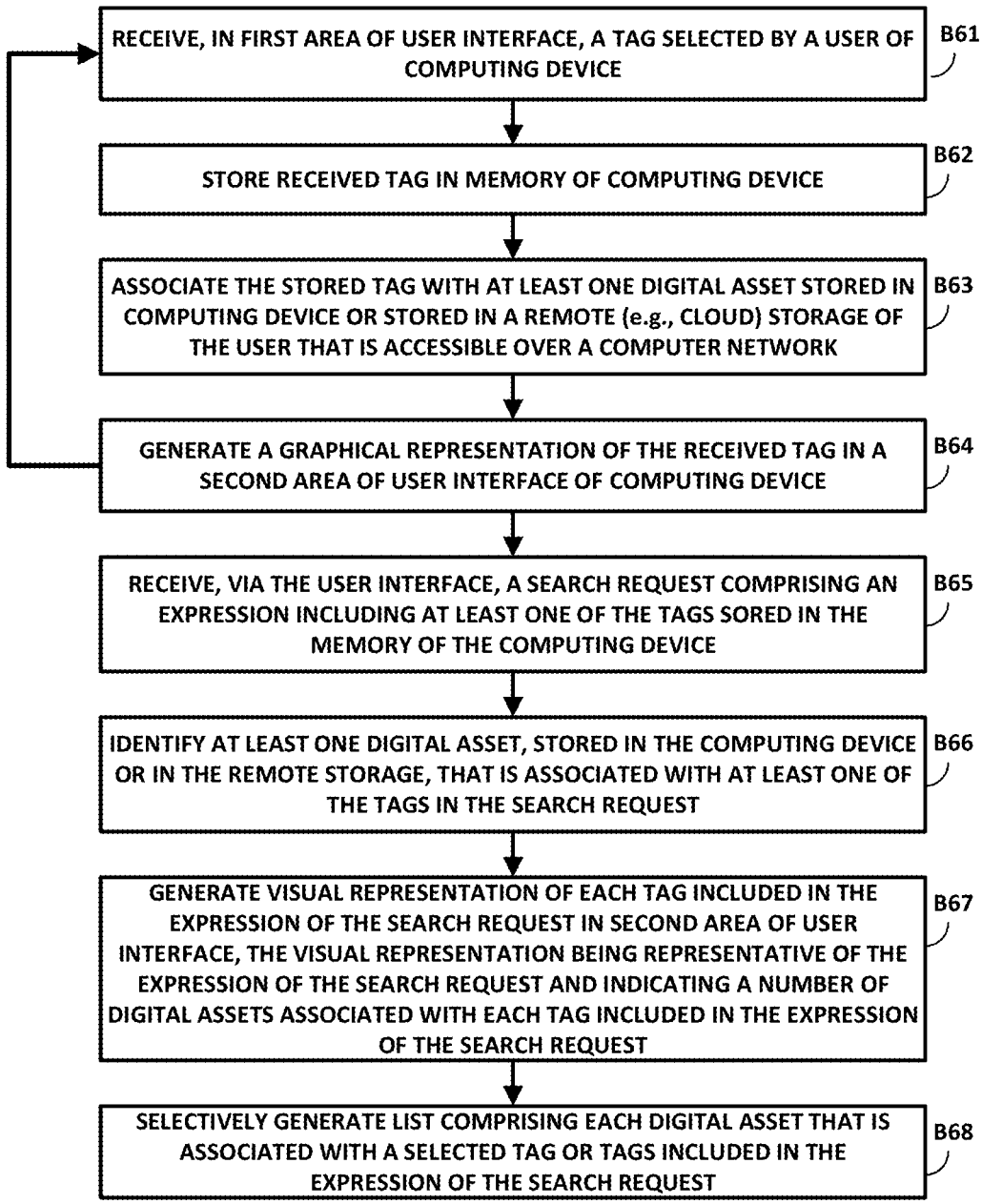
FIG. 6 is a flowchart of a computer-implemented method according to one embodiment.

FIG. 6 is a flow chart of a computer-implemented method according to one embodiment. As shown therein, the computer-implemented method may comprise iteratively performing the acts detailed in blocks B61 to B64. Indeed, block B61 calls for receiving, in a first area of a user interface of a computing device, a tag selected by a user of the computing device. As described herein above, the tag need not be descriptive of the contents but may be merely be evocative or otherwise useful, to this particular user, of the contents or of some characteristic thereof. Block B62 calls for storing the received tag in a memory of a computing device. The processor(s) of the computing device may then associate the stored tag with one or more digital assets stored in the computing device or stored in the user's remote storage (e.g., a cloud service such as Dropbox, Microsoft OneDrive, and the like) that is accessible over a computer network, as shown at B63. In this context, one embodiment distinguishes the digital assets stored in the user's computing device or user's cloud with other digital assets that may be accessible on the internet. Such other digital assets, generally speaking, are not the user's (whether an individual or a legal entity) digital assets, but are digital assets (e.g., web pages, movies on streaming services, PDF documents on public servers) that are accessible and used by the general public. Block B64 calls for the processor(s) to generate a graphical representation of the received tag in a second area of the user interface of the computing device. One possible implementation of such a graphical representation is shown at FIGS. 3 and 5. However, embodiments are not limited thereby, as other graphical representations of the generated tags may be devised, as those of skill in this art may recognize. B61, B62, B63 and B64 may be repeatedly carried out, as the user generates tags and causes them to become associated with his or her digital assets (audio files, video files, photos, text documents, PDF documents, Excel files and the like).

In block B65, the computing device may receive, via the user interface, a search request comprising an expression including at least one of the tags stored in the memory of the computing device. As noted above, the search request may, but need not, include an expression including a plurality of tags and logical, Boolean or set operators (Union, Intersection, Complement, AND, OR, NOT, etc.). The processor(s) may then identify, as shown at B66, at least one digital asset, stored in the computing device or stored in the remote storage of the user that is accessible over a computer network, that is associated with at least one of the tags in the search request. Block B66, therefore, includes within its scope, identifying all of the digital assets associated with each of the tags in the expression of the entered search request, as well as the digital assets that otherwise satisfy the expression of the search request as a whole. For example, if the search request received from the user by the computing device included the expression "(Bay Area AND (Mid-Century OR Stucco) NOT Palo Alto)" would cause the processor or processor to identify all of the user's own digital assets that were previously tagged with the user's tags "Bay Area" and "Mid-Century" or "Stucco" but would omit any of the user's own digital assets that are tagged with the user tag "Palo Alto". It is to be noted that the syntax of the expression above and the use of the AND, OR NOT operators is merely exemplary and illustrative in nature and not intended to limit any embodiment or implementation.

Block B67 calls for generating, by the processor of the computing device, a visual representation of each tag included in the expression of the search request in the second area of the user interface of the computing device. According to one embodiment, the visual representation may be representative of the expression of the search request and may indicate the number of digital assets associated with each tag included in the expression of the search request. As shown in FIG. 5, for example, the visual representation is shown at 504, with the three partially overlapping tag balls 508, 510 and 512. Here, the user tags received by the computing device include Appliance, Refrigerator and Flooring, each tag being separated by a comma. The "Appliance, Refrigerator, Flooring" string represents an expression, for which the visual representation is generated at 504. Note that the expression "Appliance, Refrigerator, Flooring" does not include any expressly-entered logical operators. The visual representation 504, therefore, shows references to all digital assets that are associated with one, two or all three entered user tags, in an easily understandable, intuitive manner, with the overlaps between tag balls showing instances where digital assets are associated with more than one user tag.

In one embodiment, a check box or some other user interface element may be provided to toggle the visual representation of the expression of the search request on and off. In a first state, the check box causes the visual representation of the expression of the search request (tag balls, in one embodiment) to be displayed and used for tagging and retrieving digital assets. In a second state thereof, the visual representation of the expression of the search request (tag balls, in one embodiment) is not displayed or used for tagging and retrieving digital assets.

Thereafter, in FIG. 6, a list comprising each digital asset that is associated with a selected tag or tags included in the expression of the search request may be generated, as shown at B68. For example, the user may select one of the tag balls 508, 510 or 512 and cause a list of the digital assets associated with the selected tag to be generated and rendered on a display of his or her computing device. Alternatively, the user may select an intersection of any or all of the tag balls and cause a corresponding list of digital assets to be generated that are associated with the intersecting area of the tag balls. Alternatively still, the user may select a union of any or all of the tag balls and cause a corresponding list of digital assets to be generated that are associated with the union of the selected tag balls.

In one embodiment, the graphical representation of the received tag may include a ball. The visual representation of each tag included in the expression of the search request may include, in one embodiment, a Venn diagram in which each tag is represented as a set. The expression of the search request may include one or more tags and/or one or more set or other logical operators. The associating of the stored tag with at least one digital asset stored in the computing device or stored in a remote storage of the user that is accessible over a computer network may be performed, according to one embodiment, with the digital asset being of any type and being stored at any location with the computing device or remote storage of the user. The digital assets may include any type of files or folders. A search name (also called a super tag herein) may be received from the user and the received search name may then be associated with the search request.

A request to edit or delete a tag selected by the user may be received by the computing device and acted upon. In one embodiment and as shown in FIG. 4, tags may be programmatically (e.g., automatically) generated and associated with one or more digital assets, without input from a user of the computing device. The programmatically generated tag may, according to one embodiment, identify an application that created the digital asset, a date of creation or update of the digital asset, a file type of the digital asset and/or a month of creation or update of the digital asset, to identify but a few of the possibilities. In one embodiment, receiving the tag selected by the user of the computing device may be performed from within a native application (e.g., MS Word, Adobe Acrobat) of the digital asset with which the selected tag is to be associated. In one embodiment, the computing device may receive a tag from and generated by a remote service over a computer network and may associate the tag received from the remote service with one or more digital assets.

In another embodiment, all of the user's digital assets may be stored remotely from the user's computing device. In that case, the functionality described herein may reside and be carried out remotely from the user's computing device. In that case, the user's computing device may act as a client, communicating with remote servers and services to carry out all or a portion of the functionality described and shown herein. Moreover, machine learning and artificial intelligence (AI) on the user's computing device and/or remote thereto may be leveraged to programmatically generate tags to be associated with the user's own digital assets.

Figure 7:
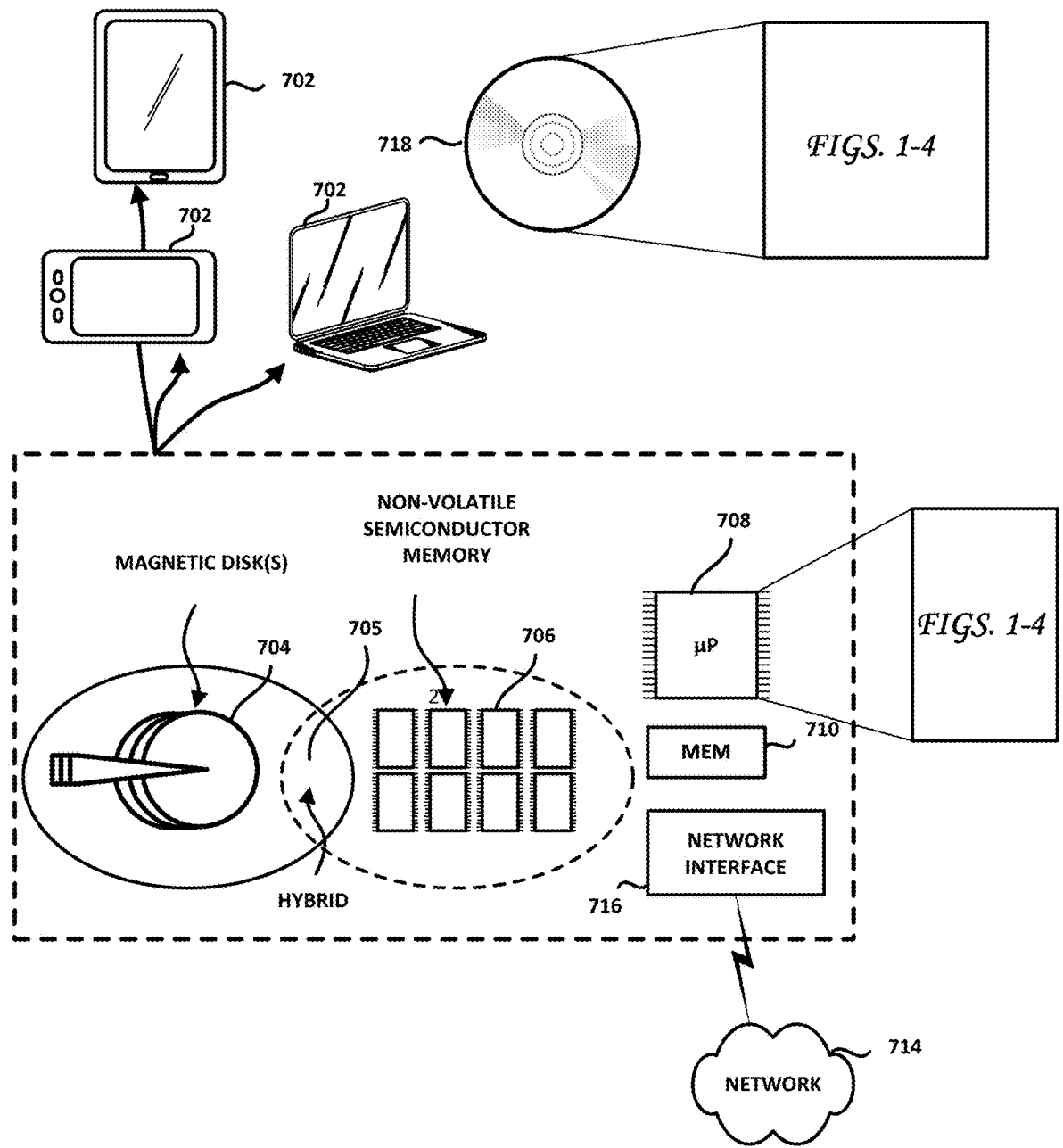
FIG. 7 shows exemplary computing devices configured according to embodiments.

FIG. 7 shows exemplary computing devices 702 configured according to embodiments. FIG. 7 also shows exemplary tangible, non-transitory computer-readable media 718, 704, 705 and/or 706 having data stored thereon representing sequences of instructions which, when executed by the computing device, cause the computing device to carry out and provide the functionality shown and described herein. As shown therein, reference numbers 702 denotes a computing device, which may include a desktop computer, a mobile device, a smart phone or watch or any other type of computing device. Such a computing device 702 may comprise direct access data storage devices such as magnetic disks 704, non-volatile semiconductor memories (EEPROM, Flash, etc.) 706, a hybrid data storage device comprising both magnetic disks 704 and non-volatile semiconductor memories, as suggested at 705, one or more microprocessors 708 and volatile memory 710. The computing device 702 may also comprise a network interface 716, configured to communicate over network 714 with remote servers (not shown in FIG. 7). References 704, 705 and 706 are examples of tangible, non-transitory computer-readable media having data stored thereon representing sequences of instructions which, when executed by a computing device, cause the computing device to carry out the computer-implemented methods and functionality described and shown herein. Some of these instructions may be stored locally in the computing device 702, while others of these instructions may be stored (and/or executed) remotely and communicated to the computing device 702 over the network 714. In other embodiments, all of these instructions may be stored locally in the computing device 702, while in still other embodiments, all of these instructions are stored and executed remotely, based on user inputs and interactions at the computing device 702, and the results communicated to the computing device 702. In another embodiment, the instructions may be stored on another form of a tangible, non-transitory computer readable medium, such as shown at 718. For example, reference 718 may be implemented as an optical (or some other storage technology) disk, which may constitute a suitable data carrier to load the instructions stored thereon onto the computing device 702, thereby re-configuring the computing device according to one or more of the embodiments described and shown herein. In other implementations, reference 718 may be embodied as an encrypted Flash drive. Other implementations are possible.

In the foregoing description, numerous specific details are set forth in order to provide a thorough understanding of one or more aspects and/or features of the exemplary embodiments. It will be apparent to one skilled in the art, however, that one or more aspects and/or features described herein may be omitted in favor of others or omitted all together. In some instances, the description of well-known process steps and/or structures are omitted for clarity or for the sake of brevity.

Herein, devices or processes that are described as being in communication with each other need not be in continuous communication with each other, unless expressly specified otherwise. In addition, devices or processes that are disclosed to be in communication with one another may communicate directly or indirectly through one or more intermediaries.

Further, although constituent steps of methods have been described in a sequential order, such methods may be configured to work in alternate orders. In other words, any sequence or order of steps that may be described herein does not, in and of itself, indicate a requirement that the steps be performed in that order. The steps of described processes may be performed in an order that differs from the order described herein. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred over other processes.

When a single device or article is described, it will be readily apparent that more than one device/article (e.g., whether or not they cooperate) may be used in place of a single device/article. Similarly, where more than one device or article is described (e.g., whether or not they cooperate), it will be readily apparent that a single device/article may be used in place of the more than one device or article. The functionality and/or the features of a device may be alternatively embodied by one or more other devices that are not explicitly described as having such functionality/features.

Lastly, while certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-implemented method, comprising:
receiving, in a first area of a user interface of a computing device, at least one tag selected by a user of the computing device, the received tag being independent of file structure, file names, folders, hierarchies, paths, locations and directories of a plurality of digital assets stored in or accessible to the computing device;
storing the received at least one tag in a memory;
associating, by a processor of the computing device, the stored at least one tag with at least one of the plurality of digital assets stored in the computing device or stored in a remote storage of the user that is accessible over a computer network; and
generating, by the processor, a graphical representation of the received at least one tag in a second area of the user interface of the computing device;
receiving, in the first area of the user interface, a user selection of at least one of the tags stored in the memory of the computing device;
identifying, by the processor of the computing device, at least one digital asset, stored in the computing device or stored in the remote storage of the user that is accessible over a computer network, that is associated with at least one of the tags of the user selection;
generating, by the processor of the computing device, a visual representation of each tag of the user selection in the second area of the user interface of the computing device,
receiving a user interaction with the generated visual representation, the received user interaction comprising selecting at least a portion of the generated visual representation and generating a search request by creating a search expression that is based upon the selected at least a portion of the generated visual representation and executing the search request;
generating, by the processor, a list comprising each digital asset that is associated with each tag of a result of the executed search request; and
displaying the generated list on a display of the computing device.

2. The computer-implemented method of claim 1, wherein the graphical representation of the received tag includes a ball.

3. The computer-implemented method of claim 1, wherein the visual representation of each tag included in the expression of the search request includes a Venn diagram in which each tag is represented as a set.

4. The computer-implemented method of claim 1, wherein the search request includes at least one of:
one or more tags; and
one or more set or other logical operators.

5. The computer-implemented method of claim 1, wherein associating the stored tag with at least one digital asset stored in the computing device or stored in a remote storage of the user that is accessible over a computer network is performed with the at least one digital asset being of any type and being stored at any location with the computing device or remote storage of the user.

6. The computer-implemented method of claim 1, wherein the at least one digital asset includes at least one of a file and a folder.

7. The computer-implemented method of claim 1, further comprising receiving from the user a search name and associating the received search name with the search request.

8. The computer-implemented method of claim 1, further comprising receiving a request to edit or delete a tag selected by the user.

9. The computer-implemented method of claim 1, further comprising programmatically generating a tag and associating the programmatically-generated tag with one or more digital assets, without input from a user of the computing device.

10. The computer-implemented method of claim 9, wherein the programmatically generated tag identifies at least one of an application that created the digital asset, a date of creation or update of the digital asset, a file type of the digital asset, and a month of creation or update of the digital asset.

11. The computer-implemented method of claim 1, wherein receiving the tag selected by the user of the computing device is performed from within a native application of the digital asset with which the selected tag is to be associated.

12. The computer-implemented method of claim 1, further comprising receiving a tag from a remote service over a computer network and associating the tag received from the remote service with at least one digital asset.

13. A computer system, comprising:
at least one processor;
at least one data storage device coupled to the at least one processor;
a plurality of processes spawned by the at least one processor, the processes including processing logic for:
receiving, in a first area of a user interface of a computing device, at least one tag selected by a user of the computing device, the received tag being independent of file structure, file names, folders, hierarchies, paths, locations and directories of a plurality of digital assets stored in or accessible to the computing device;
storing the received at least one tag in a memory;
associating, by a processor of the computing device, the stored at least one tag with at least one of the plurality of digital assets stored in the computing device or stored in a remote storage of the user that is accessible over a computer network; and
generating, by the processor, a graphical representation of the received at least one tag in a second area of the user interface of the computing device;
receiving, in the first area of the user interface, a user selection of at least one of the tags stored in the memory of the computing device;
identifying, by the processor of the computing device, at least one digital asset, stored in the computing device or stored in the remote storage of the user that is accessible over a computer network, that is associated with at least one of the tags of the user selection;
generating, by the processor of the computing device, a visual representation of each tag of the user selection in the second area of the user interface of the computing device,
receiving a user interaction with the generated visual representation, the received user interaction comprising selecting at least a portion of the generated visual representation and generating a search request by creating a search expression that is based upon the selected at least a portion of the generated visual representation and executing the search request;
generating, by the processor, a list comprising each digital asset that is associated with each tag of a result of the executed search request; and displaying the generated list on a display of the computing device.

14. The computer system of claim 13, wherein the graphical representation of the received tag includes a ball.

15. The computer system of claim 13, wherein the visual representation of each tag included in the expression of the search request includes a Venn diagram in which each tag is represented as a set.

16. The computer system of claim 13, wherein the search request includes at least one of:
   one or more tags; and
   one or more set or other logical operators.

17. The computer system of claim 13, wherein associating the stored tag with at least one digital asset stored in the computing device or stored in a remote storage of the user that is accessible over a computer network is performed with the at least one digital asset being of any type and being stored at any location with the computing device or remote storage of the user.

18. The computer system of claim 13, wherein the at least one digital asset includes at least one of a file and a folder.

19. The computer system of claim 13, further comprising processing logic for receiving from the user a search name and associating the received search name with the search request.

20. The computer system of claim 13, further comprising processing logic for receiving a request to edit or delete a tag selected by the user.

21. The computer system of claim 13, further comprising processing logic for programmatically generating a tag and associating the programmatically-generated tag with one or more digital assets, without input from a user of the computing device.

22. The computer system of claim 21 wherein the programmatically generated tag identifies at least one of an application that created the digital asset, a date of creation or update of the digital asset, a file type of the digital asset, and a month of creation or update of the digital asset.

23. The computer system of claim 13, wherein receiving the tag selected by the user of the computing device is performed from within a native application of the digital asset with which the selected tag is to be associated.

24. The computer system of claim 13, further comprising processing logic for receiving a tag from a remote service over a computer network and associating the tag received from the remote service with at least one digital asset.

25. A non-transitory computer-readable medium storing a computer program product that, when executed by a computing device, causes the computing device to perform operations comprising:
   receiving, in a first area of a user interface of a computing device, at least one tag selected by a user of the computing device, the received tag being independent of file structure, file names, folders, hierarchies, paths, locations and directories of a plurality of digital assets stored in or accessible to the computing device;
   storing, the received at least one tag in a memory;
   associating, by a processor of the computing device, the stored at least one tag with at least one of the plurality of digital assets stored in the computing device or stored in a remote storage of the user that is accessible over a computer network; and
   generating, by the processor, a graphical representation of the received at least one tag in a second area of the user interface of the computing device;
   receiving in the first area of the user interface, a user selection of at least one of the tags stored in the memory of the computing device;
   identifying, by the processor of the computing device, at least one digital asset, stored in the computing device or stored in the remote storage of the user that is accessible over a computer network, that is associated with at least one of the tags of the user selection;
   generating, by the processor of the computing device, a visual representation of each tag of the user selection in the second area of the user interface of the computing device,
   receiving a user interaction with the generated visual representation, the received user interaction comprising selecting at least a portion of the generated visual representation and generating a search request by creating a search expression that is based upon the selected at least a portion of the generated visual representation and executing the search request;
   generating, by the processor, a list comprising each digital asset that is associated with each tag of a result of the executed search request; and
   displaying the generated list on a display of the computing device.

* * * * *